US011524469B2

(12) United States Patent
Suzuki et al.

(10) Patent No.: US 11,524,469 B2
(45) Date of Patent: Dec. 13, 2022

(54) COMPOSITE MATERIAL AUTOMATIC LAMINATING DEVICE

(71) Applicant: MITSUBISHI HEAVY INDUSTRIES, LTD., Tokyo (JP)

(72) Inventors: Akihito Suzuki, Tokyo (JP); Kazuki Ishida, Tokyo (JP); Kohei Muto, Tokyo (JP); Tsuyoshi Okawara, Tokyo (JP); Kenji Murakami, Tokyo (JP); Makoto Inomoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/432,110

(22) PCT Filed: Jan. 23, 2020

(86) PCT No.: PCT/JP2020/002332
§ 371 (c)(1),
(2) Date: Aug. 19, 2021

(87) PCT Pub. No.: WO2020/170709
PCT Pub. Date: Aug. 27, 2020

(65) Prior Publication Data
US 2022/0134684 A1    May 5, 2022

(30) Foreign Application Priority Data
Feb. 22, 2019    (JP) .............................. JP2019-030532

(51) Int. Cl.
*B29C 70/38*    (2006.01)
*B29C 70/54*    (2006.01)

(52) U.S. Cl.
CPC ............ *B29C 70/38* (2013.01); *B29C 70/545* (2013.01)

(58) Field of Classification Search
CPC ...... B29C 70/38; B29C 70/382; B29C 70/384; B29C 70/386; B29C 70/388; B29C 70/545
See application file for complete search history.

(56) References Cited

U.S. PATENT DOCUMENTS

2010/0230043 A1    9/2010  Kisch
2012/0073730 A1*   3/2012  Van Nieuwenhove ................... B29C 70/384
                                                                    156/356

(Continued)

FOREIGN PATENT DOCUMENTS

JP    H0550571 A     3/1993
JP    H05314729 A    11/1993

(Continued)

OTHER PUBLICATIONS

International Search Report and Written Opinion of International Application No. PCT/JP2020/002332 dated Apr. 14, 2020; 14pp.

*Primary Examiner* — George R Koch
(74) *Attorney, Agent, or Firm* — Kanesaka Berner and Partners LLP (57) ABSTRACT

This composite material automatic laminating equipment is provided with a lamination stage a composite material winding unit which supplies a composite material sheet, supply rollers which feed the composite material sheet onto the top surface of the lamination stage or onto another composite material sheet arranged on said top surface, a compaction roller which is arranged downstream of the supply rollers and which makes surface contact with the composite material sheet and presses the composite material sheet, and a cutting section which forms composite material sheet pieces by cutting, in the width direction, the portion of the composite material sheet in surface contact with the compaction roller.

6 Claims, 5 Drawing Sheets

(56) References Cited

U.S. PATENT DOCUMENTS

| | | |
|---|---|---|
| 2013/0174969 A1 | 7/2013 | Karb et al. |
| 2015/0013892 A1 | 1/2015 | Horst et al. |
| 2016/0243769 A1 | 8/2016 | Shibutani et al. |
| 2017/0001343 A1 | 1/2017 | Tsuruta et al. |

FOREIGN PATENT DOCUMENTS

| | | |
|---|---|---|
| JP | 2013525140 A | 6/2013 |
| JP | 6386279 B2 | 9/2018 |
| WO | 2015068734 A1 | 5/2015 |
| WO | 2015118903 A1 | 8/2015 |

\* cited by examiner

COMPOSITE MATERIAL AUTOMATIC LAMINATING DEVICE

RELATED APPLICATIONS

The present application is a National Phase of International Application Number PCT/JP2020/002332 filed Jan. 23, 2020 and claims priority to Japanese Application Number 2019-030532 filed Feb. 22, 2019.

TECHNICAL FIELD

The present invention relates to a composite material automatic laminating device.

Priority is claimed on Japanese Patent Application No. 2019-030532, filed on Feb. 22, 2019, the content of which is incorporated herein by reference.

BACKGROUND ART

A composite material laminating member in which composite material sheets are laminated has been used as a skin of a wing or a fuselage of an aircraft. When the composite material laminating member is formed, a composite material automatic laminating device for automatically laminating composite material sheets is used.

The composite material automatic laminating device includes a cutter (cutting section) that cuts the composite material sheet to form a composite material sheet piece, and a compaction roller that presses the composite material sheet piece to laminate one composite material sheet on another composite material sheet.

In the composite material automatic laminating device configured in this way, a minimum length of the composite material sheet piece coincides with a distance from the cutter to the compaction roller.

Incidentally, in some cases, the composite material sheet piece having a length shorter than the distance from the cutter to the compaction roller needs to be prepared.

In this case, when the composite material automatic laminating device having a long distance from the cutter to the compaction roller is used, the composite material sheet is wasted, and an extra composite material sheet configuring the composite material sheet piece needs to be manually removed.

PTL 1 discloses a thin toe control module capable of cutting the composite material sheet piece to have a short length.

CITATION LIST

Patent Literature

[PTL 1] Japanese Patent No. 6386279

SUMMARY OF INVENTION

Technical Problem

However, the thin toe control module disclosed in PTL 1 has a complicated structure configured to include a large number of components. Consequently, it is desirable to cut the composite material sheet piece to have the short length by using a simple structure.

Therefore, the present invention aims to provide a composite material automatic laminating device capable of cutting a composite material sheet piece to have a short length by using a simple structure.

Solution to Problem

According to an aspect of the present invention, in order to solve the above-described problem, there is provided a composite material automatic laminating device including a laminating stage, a composite material winding unit that supplies a composite material sheet, a supply roller that supplies the composite material sheet onto an upper surface of the laminating stage or another composite material sheet disposed on the upper surface of the laminating stage, a compaction roller disposed on a downstream side of the supply roller, coming into surface contact with the composite material sheet, and pressing the composite material sheet, and a cutting section that forms a composite material sheet piece by cutting a portion of the composite material sheet which is in surface contact with the compaction roller in a width direction.

According to the present invention, the composite material automatic laminating device includes the compaction roller disposed on the downstream side of the supply roller, coming into surface contact with the composite material sheet, and pressing the composite material sheet, and the cutting section that forms the composite material sheet piece by cutting the portion of the composite material sheet which is in surface contact with the compaction roller in the width direction. Accordingly, the cutting section can be disposed close to the compaction roller. In this manner, compared to a case where the cutting section is disposed at a position away from the compaction roller, the composite material sheet piece can be cut to have a short length.

In addition, in the composite material automatic laminating device according to the aspect of the present invention, the cutting section may have a blade that cuts the composite material sheet. An outer peripheral portion of the compaction roller may have a groove which extends in a direction toward a rotary shaft of the compaction roller from an outer peripheral surface of the compaction roller, and into which a tip of the blade is inserted.

In this way, the outer peripheral portion of the compaction roller has the groove which extends in the direction toward the rotary shaft of the compaction roller from the outer peripheral surface of the compaction roller, and into which the tip of the blade of the cutting section is inserted. In this manner, the tip of the blade can be deeply inserted to completely penetrate the composite material sheet. Accordingly, the composite material sheet can be reliably cut.

In addition, a depth of the groove is set to a deep portion on which the tip of the blade does not abut. Accordingly, it is possible to prevent the compaction roller from being damaged by the blade of the cutting section.

In addition, in the composite material automatic laminating device according to the aspect of the present invention, a plurality of the grooves may be formed at an equal interval in a circumferential direction of the compaction roller.

In this way, the plurality of grooves are formed at the equal interval in the circumferential direction of the compaction roller. Accordingly, the length of the composite material sheet can be finely adjusted to be a desired length.

In addition, the composite material automatic laminating device according to the aspect of the present invention may further include a control device that controls the supply roller, the compaction roller, and the cutting section. The control device may cause the cutting section to cut the composite material sheet after lowering a rotation speed of the supply roller or stopping rotation of the supply roller.

The composite material automatic laminating device has the control device that performs the control. Accordingly, the composite material sheet can be safely cut.

In addition, the composite material automatic laminating device according to the aspect of the present invention may further include a direction changing roller provided between the supply roller and the compaction roller, and changing a direction of the composite material sheet to increase a contact area between an outer peripheral surface of the compaction roller and the composite material sheet.

The composite material automatic laminating device further includes the direction changing roller configured in this way. Accordingly, a region where the outer peripheral surface of the compaction roller and the composite material sheet come into contact with each other can be increased in the circumferential direction of the compaction roller. In this manner, the region where the cutting section can be disposed is increased in the circumferential direction of the compaction roller. Accordingly, a position for providing the cutting section can be more freely determined.

In addition, in the composite material automatic laminating device according to the aspect of the present invention, a material of the compaction roller may be a self-regenerative resin.

In this way, the self-regenerative resin is used as the material of the compaction roller. Accordingly, when the compaction roller is damaged by the cutting section, the damage can be repaired by itself.

According to another aspect of the present invention, in order to solve the above-described problem, there is provided a composite material automatic laminating device including a laminating stage, a composite material winding unit that supplies a composite material sheet, a supply roller that supplies the composite material sheet onto an upper surface of the laminating stage or another composite material sheet disposed on the upper surface of the laminating stage, a first compaction roller disposed on a downstream side of the cutting section, and pressing the composite material sheet, a second compaction roller disposed on the downstream side of the cutting section, disposed on an upstream side of the first compaction roller, and pressing the composite material sheet, and a cutting section disposed on a downstream side of the supply roller, and forming a composite material sheet piece by cutting the composite material sheet in a width direction.

In this way, in addition to the first compaction roller, there is provided the second compaction roller disposed on the downstream side of the cutting section, disposed on the upstream side of the first compaction roller, and pressing the composite material sheet piece. Accordingly, it is possible to reduce a distance between the second compaction roller and the cutting section. In this manner, compared to a case where only the first compaction roller is provided, the length of the composite material sheet piece can be shortened.

In addition, the composite material automatic laminating device according to the aspect of the present invention may further include a housing that accommodates the composite material winding unit and the supply roller. The cutting section may be disposed on an outside of the housing.

In this way, the cutting section is disposed on the outside of the housing that accommodates the composite material winding unit and the supply roller. Accordingly, it is possible to further reduce the distance between the second compaction roller and the cutting section. In this manner, the length of the composite material sheet piece can be further shortened.

In addition, in the composite material automatic laminating device according to the aspect of the present invention, an outer diameter of the second compaction roller may be smaller than an outer diameter of the first compaction roller.

In this way, the outer diameter of the second compaction roller is reduced to be smaller than the outer diameter of the first compaction roller. Accordingly, the cutting section can be disposed closer to the second compaction roller. Therefore, the length of the composite material sheet piece can be further shortened.

Advantageous Effects of Invention

According to the present invention, a length of a composite material sheet piece can be cut to have a short length by using a simple structure.

DESCRIPTION OF EMBODIMENTS

Hereinafter, embodiments to which the present invention has been applied will be described in detail with reference to the drawings.

First Embodiment

A composite material automatic laminating device 10 of a first embodiment will be described with reference to FIG. 1. The reference number O1 illustrated in FIG. 1 represents a rotary shaft of a compaction roller 14 (hereinafter, referred to as a "rotary shaft O1").

Figure 1:
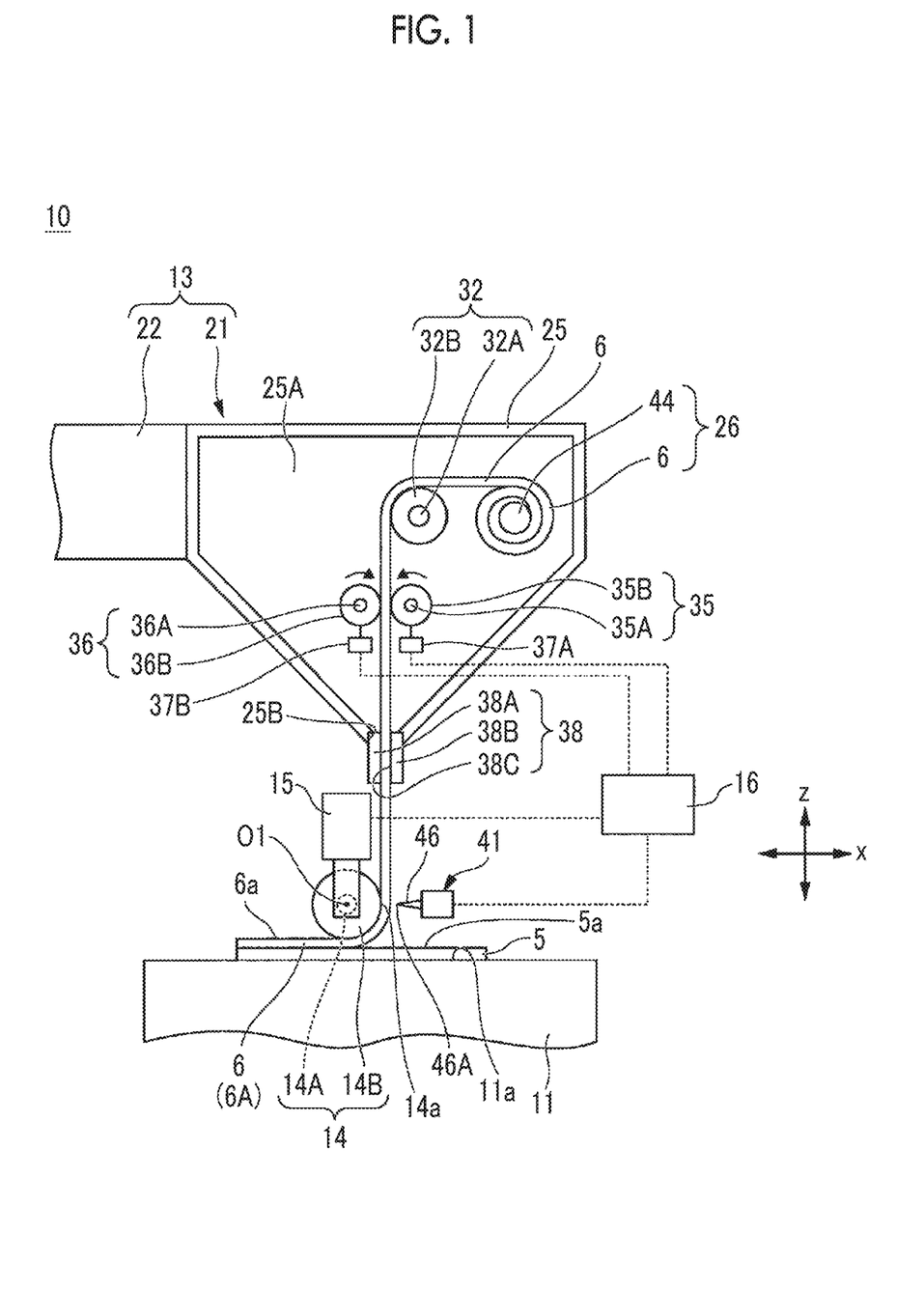
FIG. 1 is a side view illustrating a composite material automatic laminating device according to a first embodiment of the present invention.

In FIG. 1, an X-direction indicates a width direction of a laminating stage 11 (direction in which the compaction roller 14 moves when being pressed), and a Z-direction indicates a vertical direction orthogonal to the X-direction.

In FIG. 1, as an example, a case is illustrated where a composite material sheet 6 is laminated on an upper surface 5a of another composite material sheet 5 disposed on an upper surface 11a of the laminating stage 11.

Furthermore, FIG. 1 illustrates a composite material sheet piece 6A before being cut.

The composite material automatic laminating device 10 has a laminating stage 11, a laminating robot 13, a compaction roller 14, a lifting and lowering movement pressing mechanism 15, and a control device 16.

The laminating stage 11 has the upper surface 11a on which another composite material sheet 5 is placed. The upper surface 11a of the laminating stage 11 is a flat surface. For example, as another composite material sheet 5, a prepreg sheet can be used.

The laminating robot 13 has a composite material supply unit 21 and a robot arm 22.

The composite material supply unit 21 has a housing 25, a composite material winding unit 26, a drawer roller 32, supply rollers 35 and 36, rotation drive portions 37A and 37B, a guide portion 38, and a cutting section 41.

The housing 25 is provided in a tip portion of the robot arm 22, and is supported by the robot arm 22. The housing 25 is a tubular member extending to a back side of a paper surface of FIG. 1. Both ends of the housing 25 are open ends in an extending direction of the housing 25.

The housing 25 has a shape whose width in the X-direction is narrowed from an upper end toward a lower end of the housing 25. An accommodation space 25A is partitioned inside the housing 25.

A groove portion 25B extending in a direction the same as that of the housing 25 is formed in the lower end of the housing 25. The groove portion 25B communicates with the accommodation space 25A.

The housing 25 configured as described above accommodates the composite material winding unit 26, the drawer roller 32, and the supply rollers 35 and 36.

That is, the composite material winding unit 26, the drawer roller 32, and the supply rollers 35 and 36 are disposed in the accommodation space 25A.

In the first embodiment, as an example, a case has been described where both ends are the open ends in the extending direction of the housing 25. However, for example, a door that can be opened and closed may be provided in both ends of the housing 25.

The composite material winding unit 26 is disposed on a side opposite to a side to which the robot arm 22 is connected in the accommodation space 25A.

The composite material winding unit 26 has a support rod 44 and a composite material sheet 6 wound around an outer peripheral surface of the support rod 44.

The support rod 44 extends in a direction the same as the extending direction of the housing 25. The support rod 44 has a cylindrical shape. The support rod 44 is supported in a rotatable state by the housing 25. For example, as the composite material sheet 6, a prepreg sheet can be used.

The drawer roller 32 is provided in the vicinity of a center of the accommodation space 25A. The drawer roller 32 has a shaft portion 32A and a roller body 32B which extend in a direction the same as that of the housing 25.

The shaft portion 32A faces the support rod 44 in the X-direction in a state of being separated from the support rod 44. The shaft portion 32A is supported in a rotatable state by the housing 25.

The roller body 32B is fixed to an outer side of the shaft portion 32A. The roller body 32B rotates together with the shaft portion 32A.

The roller body 32B draws the composite material sheet 6 wound around the support rod 44 in a direction from the support rod 44 toward the drawer roller 32. The drawn composite material sheet 6 is in contact with a portion of an outer peripheral surface of the roller body 32B.

The supply roller 35 is disposed below the drawer roller 32. The supply roller 35 has a shaft portion 35A and a roller body 35B which extend in a direction the same as the extending direction of the housing 25.

The shaft portion 35A is supported in a rotatable state by the housing 25. The roller body 35B is fixed to the outer side of the shaft portion 35A. The roller body 35B rotates together with the shaft portion 35A. The roller body 35B has an outer peripheral surface that comes into contact with the composite material sheet 6.

The supply roller 36 is disposed to face the supply roller 35 in the X-direction. The supply roller 36 has a shaft portion 36A and a roller body 36B which extend in a direction the same as the extending direction of the housing 25.

The shaft portion 36A is supported in a rotatable state by the housing 25. The roller body 36B is fixed to an outer side of the shaft portion 36A. The roller body 36B rotates together with the shaft portion 36A. The roller body 36B has an outer peripheral surface that comes into contact with the composite material sheet 6.

The rotation drive portion 37A rotates the supply roller 35 in a direction of an arrow illustrated in FIG. 1. The rotation drive portion 37B rotates the supply roller 36 in a direction of an arrow illustrated in FIG. 1.

The supply rollers 35 and 36 are rotated in the direction of the arrow illustrated in FIG. 1. Accordingly, the composite material sheet 6 configuring the composite material winding unit 26 is fed in a direction toward the upper surface 11a of the laminating stage 11 via the guide portion 38.

The guide portion 38 is provided on a downstream side of the supply rollers 35 and 36. The guide portion 38 has a first plate portion 38A, a second plate portion 38B, and a groove 38C.

The first and second plate portions 38A and 38B are provided in the groove portion 25B of the housing 25 to face each other in the X-direction.

The groove 38C is formed between the first plate portion 38A and the second plate portion 38B. The groove 38C extends in a direction the same as the extending direction of the housing 25.

Both ends of the groove 38C in the extending direction are open ends. The width of the groove 38C in the X-direction is set to a size through which the composite material sheet 6 can pass.

The guide portion 38 configured as described above guides the composite material sheet 6 in a direction toward the laminating stage 11.

The cutting section 41 is provided on the outside of the housing 25. The cutting section 41 has a blade 46 for cutting the composite material sheet 6. A tip 46A of the blade 46 is disposed to face the rotary shaft O1 of the compaction roller 14 in a state of pressing the outer surface 6a of the composite material sheet 6 via the composite material sheet 6 in the X-direction.

In a state illustrated in FIG. 1, the composite material sheet 6 located on the outside of the housing 25 is in surface contact with a lower right half of an outer peripheral surface 14a of the compaction roller 14.

Therefore, the tip 46A of the blade 46 is disposed to face a portion of the composite material sheet 6 which comes into contact with the outer peripheral surface 14a of the compaction roller 14 in the X-direction.

The blade 46 is configured to be movable in the X-direction. The blade 46 is moved in the X-direction in a state where feeding of the composite material sheet 6 is delayed or in a state where feeding of the composite material sheet 6 is stopped. In this manner, the tip 46A of the blade 46 penetrates the composite material sheet 6, and abuts on the outer peripheral surface 14a of the compaction roller 14. Accordingly, the composite material sheet 6 is cut in a width direction (depth direction of the paper surface), thereby forming the composite material sheet piece 6A.

For example, as the cutting section 41, it is possible to use a guillotine cutter or a rotary cutter.

The compaction roller 14 is disposed on a downstream side of the supply rollers 35 and 36 and the guide portion 38. The compaction roller 14 has a shaft portion 14A and a roller body 14B which extend in the direction the same as that of the housing 25.

The shaft portion 14A is supported in a rotatable state by the lifting and lowering movement pressing mechanism 15. The roller body 14B is fixed to the outer side of the shaft portion 14A. The roller body 14B rotates together with the shaft portion 14A.

In the first embodiment, when cutting the portion where the composite material sheet 6 and the roller body 14B come into contact with each other, the blade 46 of the cutting section 41 is pressed against the outer peripheral surface 14a of the roller body 14B (compaction roller 14).

Therefore, for example, it is preferable to use a self-regenerative resin as the material of the roller body 14B. Examples of the self-regenerative resin include urethane resin and ionomer resin.

As described above, by using the self-regenerative resin as the material of the roller body 14B, when the tip 46A of the blade 46 causes a scratch on the outer peripheral surface of the roller body 14B during cutting of the composite material sheet 6, the damage can be repaired by itself.

The lifting and lowering movement pressing mechanism 15 is a mechanism for moving the compaction roller 14 in the X-direction or lifting and lowering the compaction roller 14 in the Z-direction.

The control device 16 is electrically connected to the lifting and lowering movement pressing mechanism 15, the rotation drive portions 37A and 37B, and the cutting section 41.

The control device 16 controls the lifting and lowering movement pressing mechanism 15 when moving the positions of the shaft portion 14A and the roller body 14B or when pressing the composite material sheet 6.

The control device 16 rotates the supply rollers 35 and 36 by the rotation drive portions 37A and 37B when the composite material sheet 6 is sent out.

In addition, when the control device 16 is maintained or the composite material sheet 6 is cut by using the cutting section 41, the rotation speeds of the supply rollers 35 and 36 are lowered by the rotation drive portions 37A and 37B, or the rotation of the supply rollers 35 and 36 is stopped.

Since the control device 16 that performs this control is provided, it is possible to safely cut the composite material sheet 6.

In addition, when the composite material sheet 6 is cut to form the composite material sheet piece 6A, the control device 16 controls to move the cutting section 41 in the X-direction.

According to the composite material automatic laminating device 10 of the first embodiment, it is disposed on the downstream side of the supply rollers 35 and 36 and the guide portion 38, and is in surface contact with the composite material sheet 6 and presses the composite material sheet 6. The composite material sheet piece 6A is formed by cutting the portion of the compaction roller 14 and the composite material sheet 6 that comes into surface contact with the outer peripheral surface 14a of the compaction roller 14 (lower right half of the paper surface illustrated in FIG. 1) in the width direction. Since the cutting section 41 and the cutting section 41 are provided, the cutting section 41 can be disposed close to the compaction roller 14. In this manner, the length of the composite material sheet piece 6A can be shortened as compared with the case where the cutting section 41 is disposed at a position away from the compaction roller 14.

Figure 2:
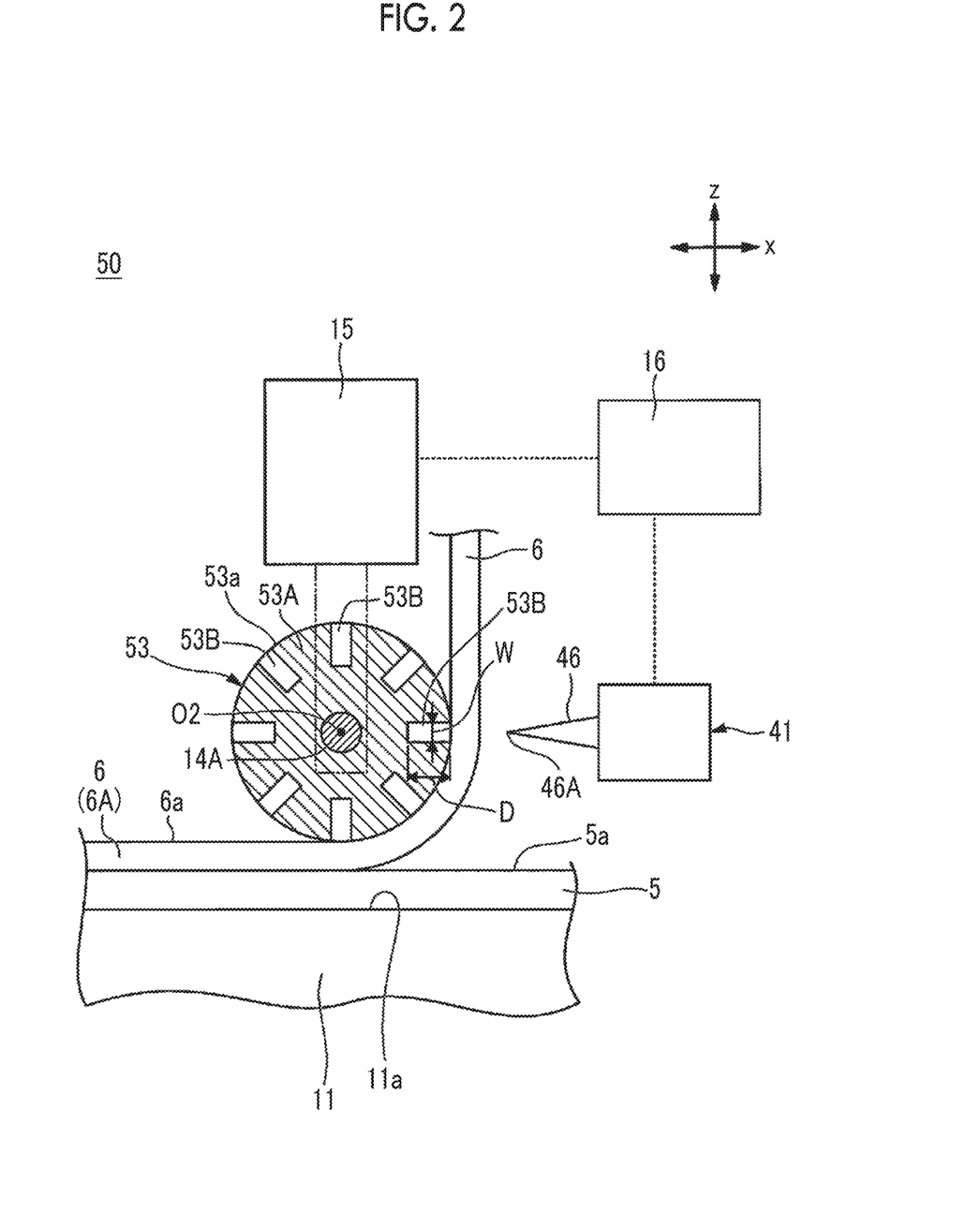
FIG. 2 is an enlarged side view of a principal section of a composite material automatic laminating device according to a modification example of the first embodiment of the present invention.

Next, the composite material automatic laminating device 50 according to the modification example of the first embodiment will be described with reference to FIG. 2. O2 illustrated in FIG. 2 indicates a rotary shaft (hereinafter, referred to as "rotary shaft O2") of the shaft portion 14A of the compaction roller 53. In FIG. 2, only the shaft portion 14A, the roller body 53A, and the groove 53B are illustrated in cross section from the viewpoint of making the plurality of grooves 53B easy to see.

In FIG. 2, D indicates the depth of the groove 53B (hereinafter, referred to as "depth D"), and W indicates the width of the groove 53B (hereinafter, referred to as "width W"). In FIG. 2, the same components as those of the structure illustrated in FIG. 1 are designated by the same reference numerals.

The composite material automatic laminating device 50 is configured in the same manner as the composite material automatic laminating device 10 except that it has a compaction roller 53 instead of the compaction roller 14 constituting the composite material automatic laminating device 10 of the first embodiment.

The compaction roller 53 has a shaft portion 14A, a roller body 53A, and a plurality of grooves 53B.

The roller body 53A is provided on the outer peripheral surface of the shaft portion 14A and has a cylindrical shape. The roller body 53A has the same configuration as the roller body 14B described in the first embodiment.

The plurality of grooves 53B are formed on the outer peripheral portion of the roller body 53A that constitutes the outer peripheral portion of the compaction roller 53.

The plurality of grooves 53B are formed at equal intervals in the circumferential direction of the roller body 53A. Each groove 53B extends toward the rotary shaft O of the shaft portion 14A from the outer peripheral surface 53a of the roller body 53A (the outer peripheral surface of the compaction roller 53) in the direction. That is, the plurality of grooves 53B are formed radially.

Each groove 53B may have a shape (depth D and width W) that can accommodate the tip 46A of the blade 46 and that the tip 46A of the blade 46 does not abut on the roller body 53A. The depth D and width W of each groove 53B can be appropriately set according to the shape of the blade 46.

According to the composite material automatic laminating device 50 of the modification example of the first embodiment, the tip 46A of the blade 46 of the cutting section 41 extends toward the rotary shaft O2 of the compaction roller 53 from the outer peripheral surface 53a of the roller body 53A. The plurality of grooves 53B to be inserted are formed in the outer peripheral portion of the compaction roller 53. In this manner, the tip 46A of the blade 46 can be deeply inserted into the compaction roller 53. Accordingly, the composite material sheet 6 can be reliably cut.

In addition, by setting the depth of the plurality of grooves 53B so that the tips 46A of the blades 46 do not come into contact with each other, damage to the compaction roller 53 by the blades 46 of the cutting section 41 can be suppressed.

In addition, by forming a plurality of grooves 53B at equal intervals in the circumferential direction of the compaction roller 53, the length of the composite material sheet 6 can be finely adjusted to be a desired length.

In the composite material automatic laminating device 50 of the modification example of the first embodiment, the case where a plurality of grooves 53B are formed has been described as an example, but the number of grooves 53B may be one or more. The configuration is not limited to the number of grooves 53B illustrated in FIG. 2.

Second Embodiment

Figure 3:
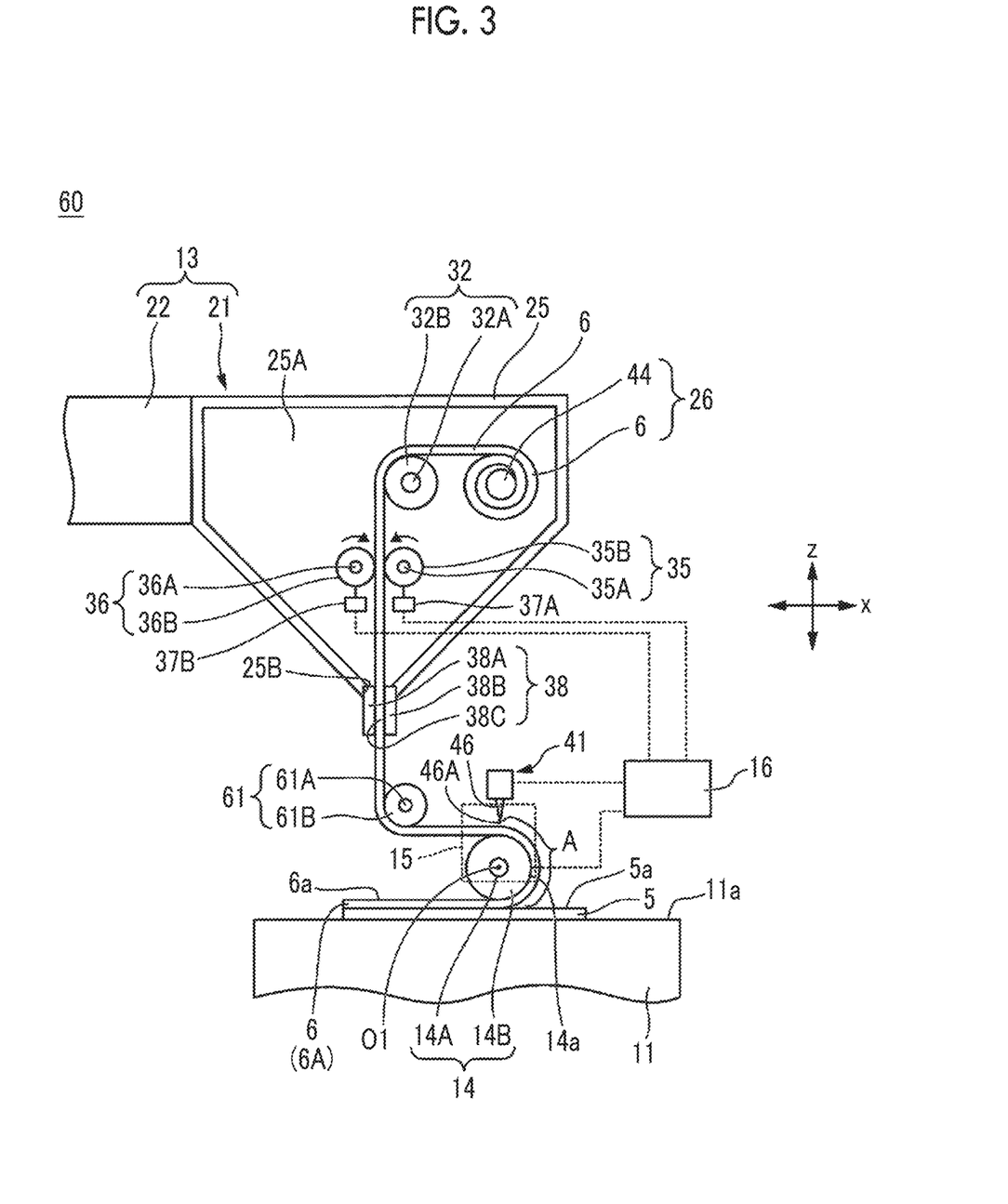
FIG. 3 is a side view illustrating a composite material automatic laminating device according to a second embodiment of the present invention.

A composite material automatic laminating device 60 of the second embodiment will be described with reference to FIG. 3. In FIG. 3, A indicates a region (hereinafter, referred to as "region A") in which the outer peripheral surface 14a of the compaction roller 14 and the composite material sheet 6 are in surface contact with each other. In FIG. 3, the same components as those of the structure illustrated in FIG. 1 are designated by the same reference numerals.

The composite material automatic laminating device 60 has a configuration the same as that of the composite material automatic laminating device 10 except that the configuration of the composite material automatic laminating device 10 of the first embodiment is further provided with a direction changing roller 61 to change a position of the cutting section 41.

The direction changing roller 61 is a roller for changing a direction of the composite material sheet 6 led out from the guide portion 38 so that a contact area is increased between the outer peripheral surface 14a of the compaction roller 14 and the outer surface 6a of the composite material sheet 6.

The direction changing roller 61 has a shaft portion 61A and a roller body 61B which extend in the direction the same as that of the housing 25.

The shaft portion 61A is supported in a rotatable state by the housing 25. The roller body 61B is fixed to an outer side of the shaft portion 61A. The roller body 61B is in contact with a portion of the composite material sheet 6. The roller body 61B is configured to be rotatable together with the shaft portion 61A.

The direction changing roller 61 configured as described above is provided (on the outside of the housing 25) between the guide portion 38 provided on the downstream side of the supply rollers 35 and 36 and the compaction roller 14. The direction changing roller 61 is provided below the guide portion 38 to face a portion of the guide portion 38 in the Z-direction.

The direction changing roller 61 is disposed on a left side (left side in FIG. 3) from a position of the compaction roller 14 so that a right half (portion corresponding to the region A) of the outer peripheral surface 14a of the compaction roller 14 and the composite material sheet 6 can come into contact with each other.

That is, in the second embodiment, compared to the first embodiment, a contact area between the outer peripheral surface 14a of the compaction roller 14 and the composite material sheet 6 is doubled.

The cutting section 41 is provided above the compaction roller 14. The cutting section 41 is disposed to face the rotary shaft O1 of the compaction roller 14 in the Z-direction.

According to the composite material automatic laminating device 60 of the second embodiment, there is provided the direction changing roller 61 configured as described above. Accordingly, it is possible to increase a region where the outer peripheral surface 14a of the compaction roller 14 and the composite material sheet 6 are in contact with each other in the circumferential direction of the compaction roller 14. In this manner, the region where the cutting section 41 can be disposed is increased in the circumferential direction of the compaction roller 14. Accordingly, a position for providing the cutting section 41 can be more freely determined.

Third Embodiment

Figure 4:
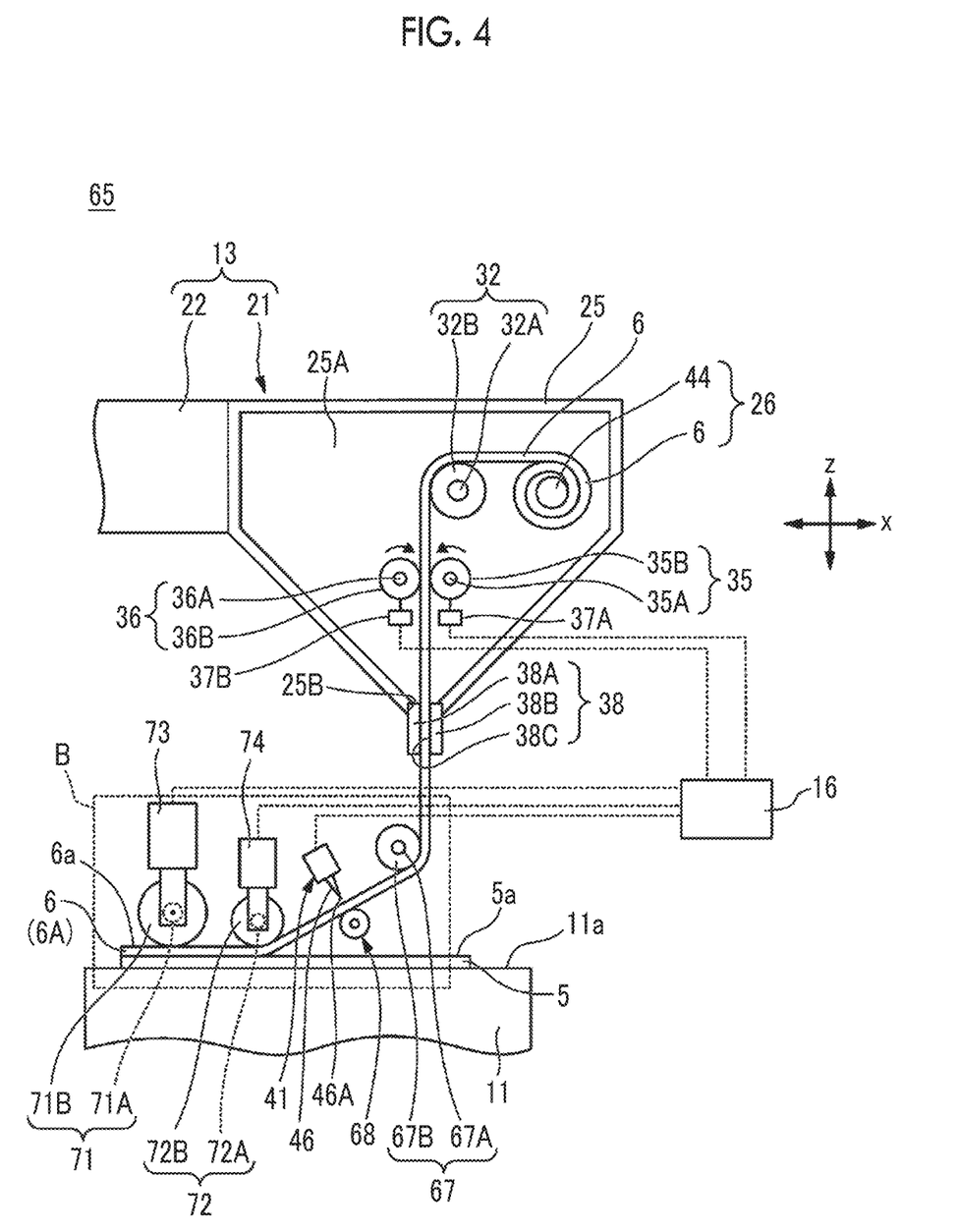
FIG. 4 is a side view illustrating a composite material automatic laminating device according to a third embodiment of the present invention.

A composite material automatic laminating device 65 of the third embodiment will be described with reference to FIGS. 4 and 5. In FIG. 4, the reference numeral B represents a region (hereinafter, referred to as a "region B") surrounding a part of the composite material automatic laminating device 65. In FIG. 4, the same reference numerals will be assigned to components the same as those of the structure illustrated in FIG. 1.

Figure 5:
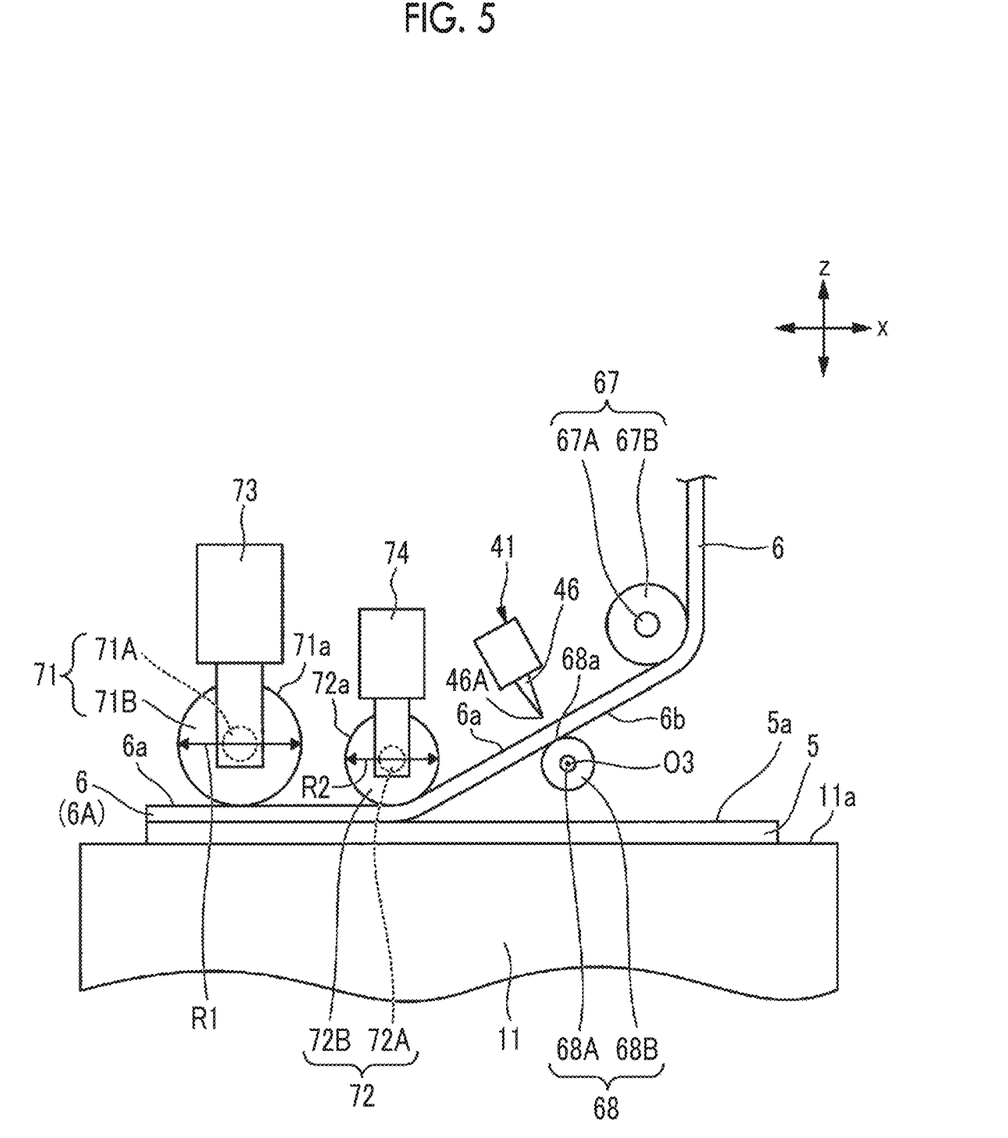
FIG. 5 is an enlarged view of a portion surrounded by a region B in the composite material automatic laminating device illustrated in FIG. 4.

In FIG. 5, the reference numeral R1 represents an outer diameter of the first compaction roller 71 (hereinafter, referred to as an "outer diameter R1"), and the reference numeral R2 represents an outer diameter of the second compaction roller 72 (hereinafter, referred to as an "outer diameter R2"). In FIGS. 4 and 5, the same reference numerals will be assigned to the same components.

The composite material automatic laminating device 65 has a configuration the same as that of the composite material automatic laminating device 10 except for the followings. The configuration of the composite material automatic laminating device 10 of the first embodiment is further provided with a roller 67 and a cutting table roller 68. The position of the cutting section 41 is changed, and the compaction roller 14 and the lifting and lowering movement pressing mechanism 15 which configure the composite material automatic laminating device 10 are replaced with a first compaction roller 71, a second compaction roller 72, and lifting and lowering movement pressing mechanisms 73 and 74.

The roller 67 is disposed on the downstream side of the guide portion 38 (on the outside of the housing 25), and is disposed on the upstream side of the cutting table roller 68. The roller 67 is disposed below the guide portion 38, and faces a portion of the guide portion 38 in the Z-direction.

The roller 67 has a shaft portion 67A and a roller body 67B which extend in the direction the same as that of the housing 25.

The shaft portion 67A is supported in a rotatable state by the housing 25. The roller body 67B is fixed to the outer side of the shaft portion 67A. The roller body 67B guides the composite material sheet 6 diagonally downward (diagonally leftward and downward in FIG. 4) by coming into contact with a portion of the composite material sheet 6. The roller body 67B is configured to be rotatable together with the shaft portion 67A.

The cutting table roller 68 is provided on the downstream side of the roller 67, and is provided on the upstream side of the second compaction roller 72.

The cutting table roller 68 has a shaft portion 68A and a roller body 68B which extend in the direction the same as that of the housing 25.

The shaft portion 68A is supported in a rotatable state by the housing 25. The roller body 68B is fixed to the outer side of the shaft portion 68A. The roller body 68B rotates together with the shaft portion 68A.

An outer peripheral surface 68a of the roller body 68B (outer peripheral surface of the cutting table roller 68) is in contact with an inner surface of the composite material sheet 6 disposed between the roller 67 and the second compaction roller 72.

The cutting table roller 68 configured as described above is a roller that functions as a table on which the tip 46A of the blade 46 of the cutting section 41 abuts when the composite material sheet 6 is cut by using the cutting section 41.

The cutting section 41 is provided on the outside of the housing 25, is provided on the downstream side of the roller 67, and is provided on the upstream side of the second compaction roller 72. The cutting section 41 is disposed on the outside of the housing 25 in this way. Accordingly, the distance can be reduced between the cutting section 41 and the first compaction roller 71.

The cutting section 41 is disposed so that the tip 46A of the blade 46 faces the outer surface 6a of the composite material sheet 6 located between the roller 67 and the second compaction roller 72. That is, the cutting section faces the cutting table roller 68 in a direction orthogonal to the outer surface 6a via the composite material sheet 6.

The first compaction roller 71 is disposed on the downstream side of the cutting section 41. The first compaction roller 71 has a shaft portion 71A and a roller body 71B which extend in the direction the same as that of the housing 25.

The shaft portion 71A is supported in a rotatable state by the lifting and lowering movement pressing mechanism 73. The roller body 71B is fixed to the outer side of the shaft portion 71A. An outer peripheral surface 71a of the roller body 71B is a surface that presses the outer surface 6a of the composite material sheet 6. The roller body 71B rotates together with the shaft portion 71A.

The second compaction roller 72 is disposed on the downstream side of the cutting section 41, and is disposed on the upstream side of the first compaction roller 71.

Therefore, the second compaction roller 72 is disposed at a position closer to the cutting section 41 than the first compaction roller 71.

The second compaction roller 72 has a shaft portion 72A and a roller body 72B which extend in the direction the same as that of the housing 25.

The shaft portion 72A is supported in a rotatable state by the lifting and lowering movement pressing mechanism 74. The roller body 72B is fixed to the outer side of the shaft portion 72A. An outer peripheral surface 72a of the roller body 72B is a surface that presses the outer surface 6a of the composite material sheet 6. The roller body 72B rotates together with the shaft portion 72A.

For example, it is preferable that the outer diameter R2 of the second compaction roller 72 is smaller than the outer diameter R1 of the first compaction roller 71.

In this way, the outer diameter R2 of the second compaction roller 72 disposed on the cutting section 41 side is set to be smaller than the outer diameter R1 of the first compaction roller 71. Accordingly, the cutting section 41 can be brought closer to the first compaction roller 71. Therefore, the length of the composite material sheet piece 6A to be cut by the cutting section 41 can be further shortened.

In addition, the first compaction roller 71 having the outer diameter R1 larger than the outer diameter R2 of the second compaction roller 72 is disposed on the downstream side of the second compaction roller 72. Accordingly, when a pressing force of the second compaction roller 72 is insufficient, the first compaction roller 71 can compensate for the insufficient pressing force by using the second compaction roller 72.

The lifting and lowering movement pressing mechanism 73 is a mechanism for moving the first compaction roller 71 in the X-direction or for lifting and lowering the first compaction roller 71 in the Z-direction.

The lifting and lowering movement pressing mechanism 74 is a mechanism for moving the second compaction roller 72 in the X-direction or lifting and lowering the second compaction roller 72 in the Z-direction.

According to the composite material automatic laminating device 65 of the third embodiment, in addition to the first compaction roller 71, the second compaction roller 72 disposed on the downstream side of the cutting section 41 and disposed on the upstream side of the first compaction roller 71 is provided. Accordingly, it is possible to reduce the distance between the second compaction roller 72 and the cutting section 41. In this manner, compared to a case where only the first compaction roller 71 is provided, the length of the composite material sheet piece 6A can be shortened.

Hitherto, the preferred embodiments of the present invention have been described in detail. However, the present invention is not limited to the specific embodiments, and can be modified and changed in various ways within the scope of the concept of the present invention disclosed within the scope of the appended claims.

INDUSTRIAL APPLICABILITY

The present invention is applicable to a composite material automatic laminating device.

REFERENCE SIGNS LIST

5: other composite material sheet
5a: upper surface
6: composite material sheet
6a: outer surface
6A: composite material sheet piece
6b: inner surface
10, 50, 60, 65: composite material automatic laminating device
11: laminating stage
11a: upper surface
13: laminating robot
14,53: compaction roller
14a, 53a, 68a, 71a, 72a: outer peripheral surface
14A, 32A, 35A, 36A, 61A, 67A, 68A, 71A, 72A: shaft portion
14B, 32B, 35B, 36B, 53A, 61B, 67B, 68B, 71B, 72B: roller body
15, 73, 74: lifting and lowering movement pressing mechanism
16: control device
21: composite material supply unit
22: robot arm
25: housing
25A: accommodation space
25B: groove portion
26: composite material winding unit
32: drawer roller
35, 36: supply roller
37A, 37B: rotation drive portion
38: guide portion
38A: first plate portion
38B: second plate portion
38C: groove
41: cutting section
44: support rod
46: blade
46A: tip
53B: groove
61: direction changing roller
67: roller
68: cutting table roller 71: first compaction roller
72: second compaction roller
A, B: region
D: depth
O1 to O3: rotary shaft
W: width
R1, R2: outer diameter

The invention claimed is:

1. A composite material automatic laminating device comprising:
a laminating stage;
a composite material winding unit having a support rod, and configured to supply a composite material sheet wound around an outer peripheral surface of the support rod;
a supply roller configured to supply the composite material sheet onto an upper surface of the laminating stage or another composite material sheet disposed on the upper surface of the laminating stage;
a compaction roller disposed on a downstream side of the supply roller, and configured to come into surface contact with the composite material sheet and press the composite material sheet by rotating around a rotation axis of the compaction roller; and
a blade configured to be movable toward the compaction roller to form a composite material sheet piece by, when the blade is close to the compaction roller, cutting a portion of the composite material sheet which is in surface contact with the compaction roller in a width direction,
wherein an outer peripheral portion of the compaction roller includes a groove extending toward the rotation axis of the compaction roller and having a depth such that a tip of the blade does not come into contact with the compaction roller when the blade is close to the compaction roller.

2. The composite material automatic laminating device according to claim 1,
wherein the groove comprises a plurality of grooves formed at an equal interval in a circumferential direction of the compaction roller.

3. The composite material automatic laminating device according to claim 1, further comprising:
a control device configured to control the supply roller, the compaction roller, and the blade,
wherein the control device is configured to cause the blade to cut the composite material sheet after lowering a rotation speed of the supply roller or stopping rotation of the supply roller.

4. The composite material automatic laminating device according to claim 1, further comprising:
a direction changing roller provided between the supply roller and the compaction roller, and configured to change a direction of the composite material sheet to increase a contact area between an outer peripheral surface of the compaction roller and the composite material sheet.

5. The composite material automatic laminating device according to claim 1, wherein a material of the compaction roller is a self-regenerative resin.

6. A composite material automatic laminating device comprising:
a laminating stage;
a composite material winding unit having a support rod, and configured to supply a composite material sheet wound around an outer peripheral surface of the support rod;
a cutting section having a blade with a tip and disposed on a downstream side of the supply roller, the cutting section configured to produce a composite material sheet piece by cutting the composite material sheet in a width direction;
a cutting table roller configured to abut the tip of the blade of the cutting section when the cutting section cuts the composite material sheet;
a supply roller configured to supply the composite material sheet onto an upper surface of the laminating stage or another composite material sheet disposed on the upper surface of the laminating stage;
a first compaction roller disposed on a downstream side of the cutting section, and configured to press the composite material sheet;
a second compaction roller disposed on the downstream side of the cutting section and an upstream side of the first compaction roller, and configured to press the composite material sheet; and
a housing configured to accommodate the composite material winding unit and the supply roller, wherein
the cutting section and the cutting table roller are disposed on an outside of the housing,
an outer diameter of the second compaction roller is smaller than an outer diameter of the first compaction roller, and
the second compaction roller is positioned close to the cutting section.

* * * * *